Feb. 22, 1938.   C. H. VEEDER   2,109,186
THEODOLITE
Filed June 4, 1936   3 Sheets-Sheet 1

INVENTOR
Curtis H. Veeder
ATTORNEY

Feb. 22, 1938.  C. H. VEEDER  2,109,186
THEODOLITE
Filed June 4, 1936  3 Sheets—Sheet 3

INVENTOR
Curtis H. Veeder
By
ATTORNEY

Patented Feb. 22, 1938

2,109,186

UNITED STATES PATENT OFFICE 2,109,186

THEODOLITE

Curtis H. Veeder, Hartford, Conn.

Application June 4, 1936, Serial No. 83,545

31 Claims. (Cl. 33—72)

My invention relates to theodolites.

In surveying, when extreme accuracy is required in measuring angles, as, for example, in triangulation, the measurement of each angle is taken a large number of times, and the average of these measurements is used as the true determination of the angles. Thus, in one well known procedure of repeating angles, the measurement of the angle from target to target is taken in four sets of ten observations each, in such manner as to compensate errors due to inaccuracies in adjustments of the instrument, graduations of the scales and clamping errors, and also to average errors on the part of the observer in sighting the target, reading the vernier, and the like. Such a procedure involves eighty target sighting operations and not only consumes much time in locating the target through the telescope, but places a great strain on the observer, particularly if the stations are located at a considerable distance, as is usually the case in triangulation. It is well known that the longer it takes to complete the observations the less accurate will be the results, due to the fact that the accuracy of the observer is impaired by fatigue and the instrument is subject to variations from external sources, and consequently it is very desirable that the work be completed as quickly as possible.

My invention has among its objects to provide an improved instrument for use in the measurement of angles having novel means associated therewith by which one or more positions of the telescope, both as regards the horizontal direction of the sight and the inclination of the same, can be established and to any of which the observer can return the telescope quickly and easily at will. More particularly, it is an object of my invention to provide such an improved instrument having novel sets of cooperating adjustable abutment or stop means, which means are adjustable vertically and horizontally to a definite position of the telescope when a target is sighted through the latter, and by means of which stop means the telescope can be quickly returned to and pick up the target for which a set of stops may have been adjusted. It is a further object of my invention to greatly reduce the time involved in the measurement of angles by the methods of repeating angles, repeating observations, or the like, while also eliminating much of the strain on the observer formerly involved in repeatedly finding and accurately sighting the targets. These and other objects and advantages of my improved construction will, however, hereinafter more fully appear.

In these drawings,—

Figure 1:
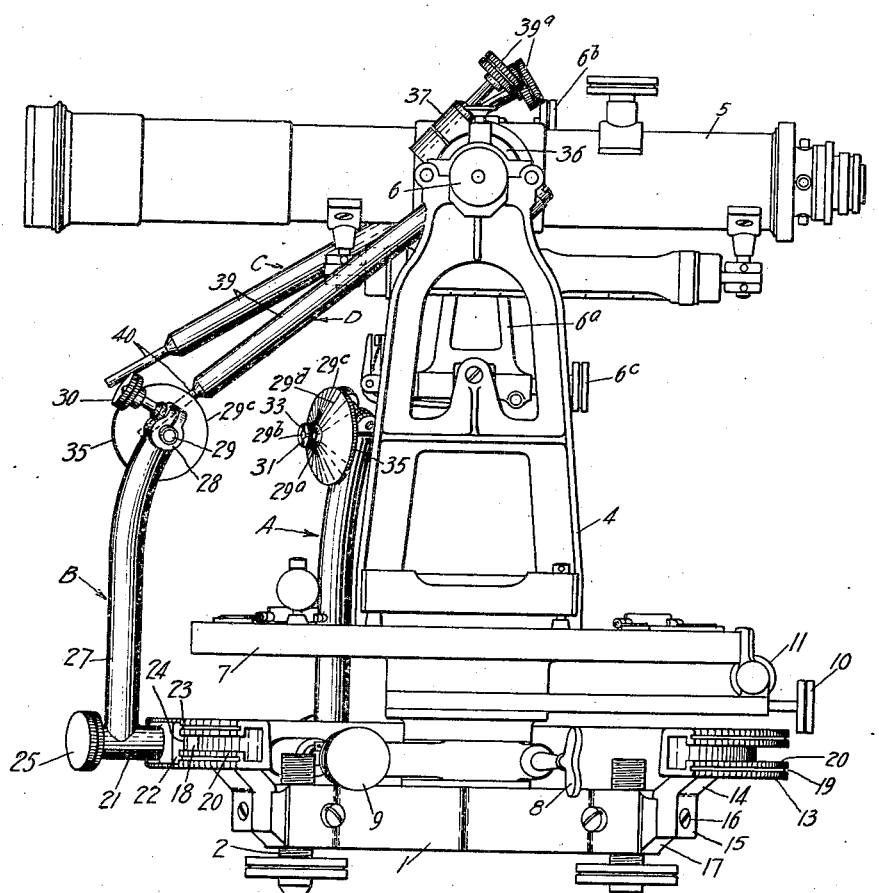
Figure 1 is a side elevation of a well known theodolite equipped with my improved mechanism, its parts being illustrated with the telescope sighted on a target and one set of cooperating stop means in engagement.

In this illustrative construction, I have shown the stop mechanism of my invention applied to a theodolite of a well known "Kueffel and Esser" construction including a fixed support or leveling head I carrying the usual leveling screws 2 by means of which the instrument is connected to and leveled on a supporting tripod or other support provided at the station from which observations are to be made. An inner vernier plate 3 is rotatably mounted in the leveling head on a vertical inner solid spindle (not shown) and carries the usual U-shaped standards 4 in the upper ends of which are journaled the trunnions 6 comprising the horizontal axis of the usual telescope 5. The telescope is held against movement about its horizontal axis by means of a depending arm 6a having a split axle clamp journaled on one of the trunnions and clamped rigidly thereto by a clamping screw 6b. The arm 6a has a microscrew connection 6c at its lower end with a lug on the adjacent upright of standards 4 by means of which the telescope and arm can be accurately adjusted following clamping in the usual manner. A usual horizontal limb 7 is carried by an outer concentric center, or spindle, and is likewise rotatable in the leveling head. A usual lower clamping screw 8 and tangent screw 9 are provided for clamping the horizontal limb to the leveling head and adjusting the relation thereof following clamping, and a similar upper clamping screw 10 and tangent screw 11 are provided for the vernier plate 3. Thus, it will be clear that it is possible to move either the vernier plate with its telescope or the horizontal limb relative to the leveling head about the same vertical axis, and that by clamping the outer center carrying the horizontal limb to the leveling head, horizontal angles may be read by noting the vernier readings on the graduated circle of the fixed horizontal limb for the different pointings of the telescope. As herein shown, the circle carries graduations from 0 to 360°, while the vernier plate carries two conveniently located vernier scales. It will thus be evident that in the instrument herein shown, the telescope can be swung about a vertical axis and also about a horizontal axis, thus to set the same on a target, and that it can be clamped in this position and adjusted to the target with great accuracy by means of the tangent screws in the usual manner.

When great accuracy is required in the measurement of horizontal angles, as in triangulation, an angle to be determined may be read a large number of times and with certain variations in the use of the instrument in order to offset mechanical errors in the instrument and human errors on the part of the observer. This may be done by the method of repeating angles, or by the method of repeating observations, or by other methods well known. By any of these methods, it is necessary for the observer to sight first one target and then the other repeatedly. The stations to be sighted may be located at a considerable distance, frequently several miles, and the long time that the instrument must be set up and the strain on the operator in repeatedly sighting the targets becomes considerable and affects the accuracy of the result.

In accordance with the present invention, means are provided for establishing the line of sight of the telescope when it is set on the target of one or more stations so that the observer can quickly return the telescope to a position very closely approximating the exact setting on the target without the necessity of locating the target each time, thus effecting a very considerable saving in time and energy. As herein shown, provision is made for establishing two positions of the telescope corresponding to two stations which are to be observed in reading an angle, although more positions can be established if desired.

To this end, a horizontal arcuate stop ring 13 is located below the horizontal limb and adjacent to the leveling head. This ring, as herein shown, has three integral depending attaching legs 14 having offset vertical portions 15 secured to the leveling head by means of suitable screws 16, a horizontal shoulder 17 being provided thereon for locating and supporting the same rigidly on the leveling head. As shown most clearly in Figures 1 and 6, the ring 13 is generally rectangular in cross-section and has a concentric passage therein also rectangular in section adapted to receive a suitably curved sliding nut 18, a portion of the ring being cut away, as shown in Figure 1, to permit easy access to the clamping screw 8 and tangent screw 9 and also to permit entry of the nut 18 into the concentric passage. The outer vertical face of the hollow ring constitutes a horizontal track having vertically spaced wedge-shaped grooves 19 formed therein and a central peripheral guide slot 20 communicating with the inner rectangular passage. One or more horizontally adjustable stop means, herein two, generally indicated at A and B, are adapted to be supported on said stop ring. These stop means A and B are identical and only one will be described in detail. Considering the left hand stop means A, this includes a generally cylindrical clamping bracket 21, Figure 6, adapted to be clamped to stop ring 13 in a plurality of horizontally adjusted positions. The bracket is provided at its inner end with a plate 22 having a vertical inner face of suitable lateral dimension to obtain a good bearing on said track and curved to conform to the outer curved periphery of said stop ring and provided with spaced annular wedge shaped ribs 23 adapted to cooperate with the grooves 19 of the track. The plate 22 is also provided with an intermediate rectangular rib or tongue portion 24 which projects into and closely fits the peripheral passage 20 of the ring but which terminates short of the outer circular wall of the rectangular passage. A clamping screw 25 extends through the clamp bracket and plate and is threaded into the sliding nut 18, whereby to clamp the bracket rigidly against the track in any desired position of horizontal adjustment on the stop ring. The clamp bracket is also provided with a smaller upstanding cylindrical boss 26 of a suitable size to fit closely within the bore of a tubular arm 27 to which the clamp bracket is permanently secured, as by brazing. The arm 27 carries on its upper end a generally cylindrical, horizontal bracket 28 (Figure 5) which is permanently fixed to the upper end of the tubular arm by means of a cylindrical boss (not shown) in a manner similar to the connection of the clamping bracket 21 above described. The bracket 28 has a horizontal threaded passage therein which is located tangentially of the stop ring and is adapted to receive a finely threaded stud 29 constituting micro-adjusting means for a stop, or abutment member. The bracket 28 is split at its upper end and has a clamping screw 30 which serves to clamp the threaded stud 29 in the bracket. It will be noted that the arm 27 is slightly curved inwardly at its upper end toward the instrument so that the threaded stud 29 of the stop disc is located substantially over the outer periphery of the stop ring and tangentially thereof. This inclination of the upper end of the arm 27 locates the stop closer to the vertical axis of the instrument and also serves to locate the clamping screws 30 in convenient position for operation.

Figure 5A:
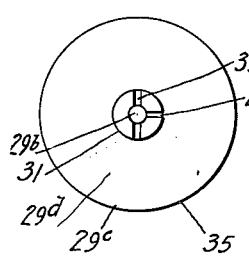
Fig. 5a is a detail side elevation of the stop member of Fig. 5.
Figure 5:
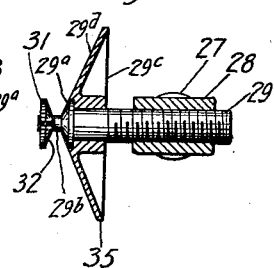
Fig. 5 is an enlarged sectional detail of a stop member and its supporting bracket.
Figure 6:
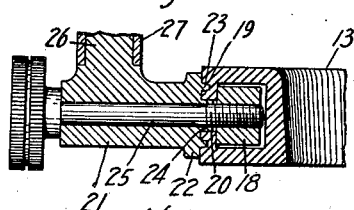
Fig. 6 is an enlarged sectional detail of the stop ring, clamping bracket and sliding nut.
Figure 3:
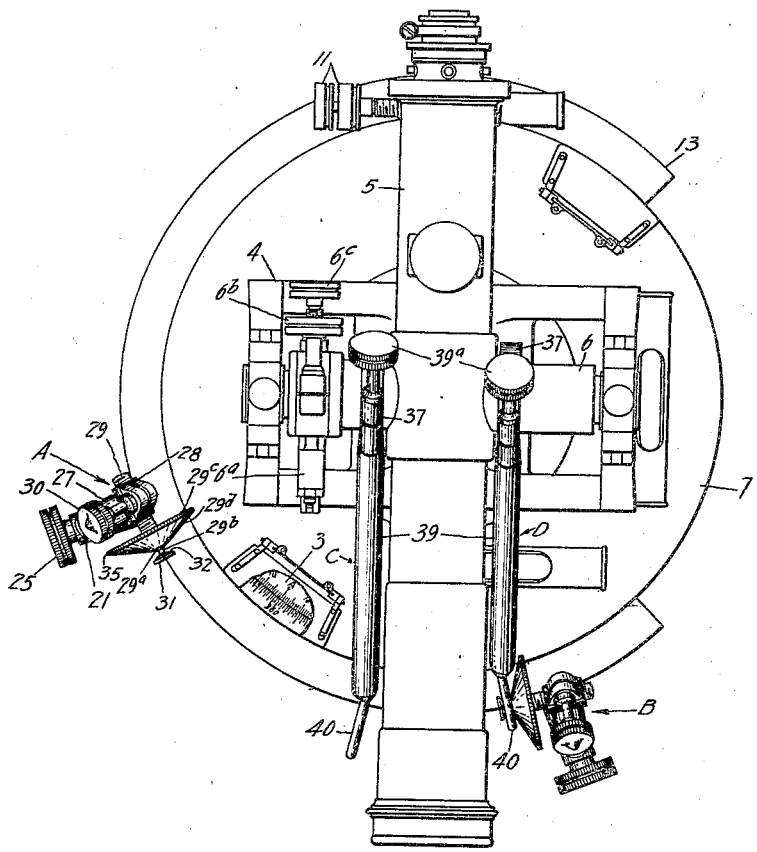
Figure 3 is a plan view of Figure 2.

As is most clearly shown in Figure 5, the stud 29 has a frustro-conical head 29a terminating in a small threaded stud 29b and carries a stop disc 29c having a conical guide face 29d forming an extension of the conical head 29a. The threaded stud 29b has a knurled nut 31 threaded onto the outer end thereof and this nut is provided with a conical face 32 which cooperates with the face 29a to provide an annular groove having oppositely inclined walls 32 and 29a connected by a bottom wall comprising stud 29b, the width of the groove being varied by adjusting the nut 31 on the stud 29b. The nut 31 is provided with a screw driver slot 33 and is also split so as to provide sufficient friction to maintain it in any adjusted position relative to the stud 29b. The stop disc 29c is provided with a knurled periphery 35 by which the stud 29 can be adjusted in the bracket 28 whenever the clamping screw 30 is released.

Figure 2:
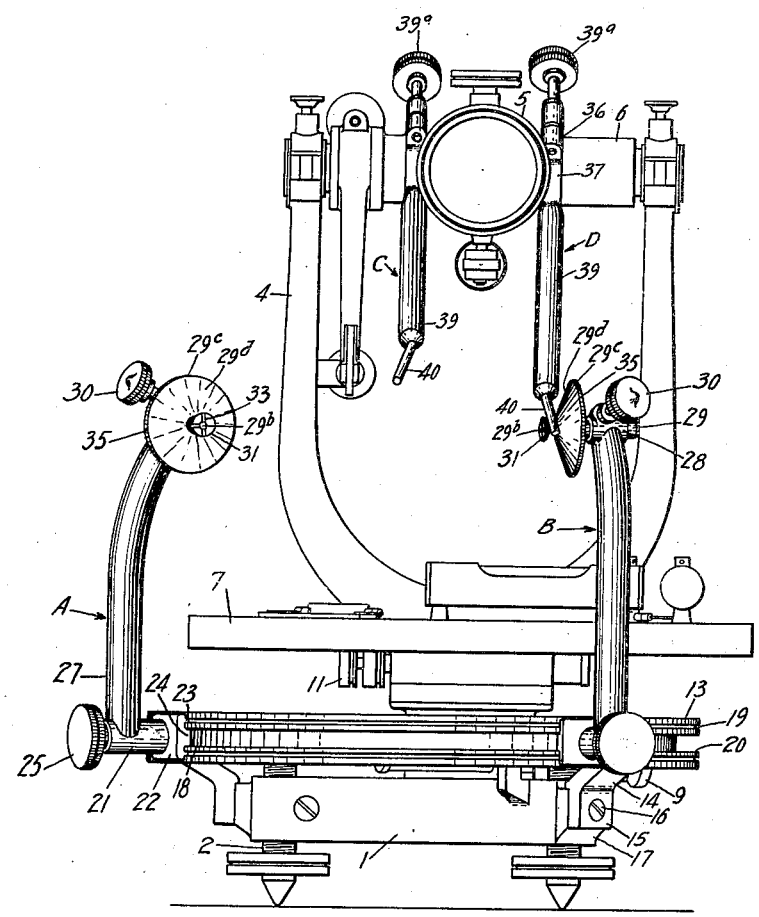
Fig. 2 is an end view of Figure 1.

The second horizontally adjustable stop means B is identical with that above described, except that the stud 29 carrying the stop member is oppositely inserted in bracket 28 so that the conical stop discs are located in confronting relation as shown in Figure 2.

Figure 4:
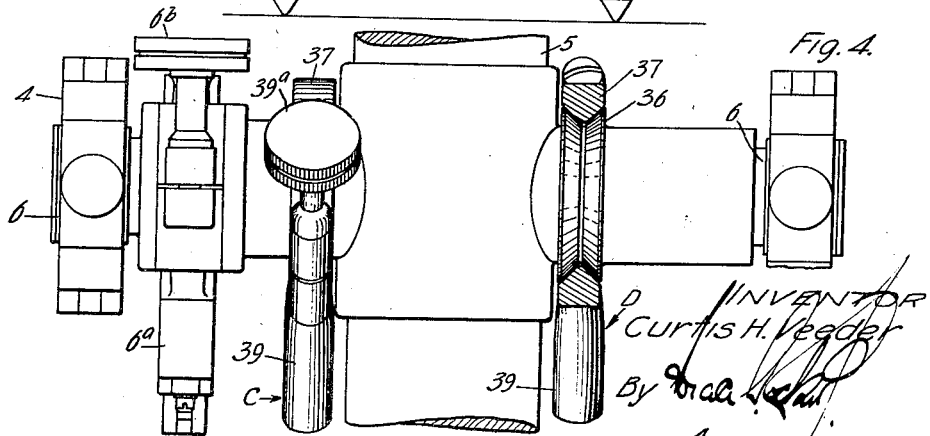
Fig. 4 is an enlarged plan view of the telescope axis, with one of the axle clamps in section.

A pair of cooperating vertically adjustable stop arms C and D are carried by the telescope which are adapted to cooperate with the horizontally adjustable stop means A and B above described. These stop arms are journaled for rotation about the horizontal telescope axis and to this end the telescope supporting trunnions 6 are provided on opposite sides of the telescope with annular bosses (Fig. 4) which are turned down to provide V-shaped journals 36 for the split, wedge shaped axle clamps 37, each of which is provided with outstanding cylindrical bosses (not shown) on which radially extending straight tubular arms 39 are permanently and rigidly secured, as by brazing. These arms also have stop pins 40 permanently secured in their free ends which are just long enough to cooperate with the stop members of stop means A and B previously described. It will be noted that the ends of pins 40 are offset in opposite directions so that the imaginary extensions thereof in the direction of the telescope axis coincide at the point intersected by the horizontal and vertical axes of the telescope. With the exception of the opposite direction of offset of the stop pins 40, required due to the off-center location of the axle clamps 37, these vertically adjustable stop means are identical. Clamping screws 39a are provided for fixing axle clamps 37 against rotation on journals 36.

It will be noted that, due to the above described deflection of the stop pins 40, the latter coincide with radii of the horizontal stop ring and consequently lie perpendicular to the studs 29 which are tangentially located relative to this ring, and that this relation of the stop pins 40 and the studs 29 is maintained regardless of the horizontal and vertical movements of the telescope and the corresponding movements of the stop means A and B.

In the operation of the construction above described, it will be understood that the instrument is set up on a station representing the vertex of the angle, or angles, to be determined. The telescope is then directed to the target on the first, or left hand station, both upper and lower clamps 8 and 10 tightened and the telescope clamped by means of screw 6b. The horizontal and vertical adjustments are made by means of the tangent screw 9 and micro screw 6c to set the telescope exactly on the target. While the horizontal limb and the telescope remain fixed in this position, the clamping screw 25 for the right hand stop means B is loosened and the latter is moved along the horizontal track until the stop pin 40 of stop arm D drops into and engages the stud 29b constituting the bottom of the groove in the stop member. This operation is best carried out by pressing the arm 39 downward gently while lightly shaking the stop means B laterally into a position in which the pin 40 settles down into the bottom of the groove. Here it will be understood that the pin 40 is not a tight fit between the inclined walls 32 and 29a of the groove, the member 31 instead being adjusted on stud 29b so that a small amount of sideplay exists between the opposed inclined surfaces 32, 29a and the pin 40. The stop means B is clamped in this position by means of the clamp screw 25 and the stop arm 39 is likewise clamped by means of its clamping screw 39a. Sighting through the telescope with the plate clamp 8 loose, the observer next adjusts the side-play of the stop pin 40 between the surfaces 32, 29a by grasping the knurled portion 35 of the stop disc and adjusting the stud 29 relative to its bracket 28. During this operation, the telescope is swung gently from side to side through the slight distance permitted by the movement of pin 40 in the groove until the target is centered between the limits of this movement. The stop disc 29c is clamped in this adjusted position by means of the clamping screw 30. The setting of the cooperating stops B and D, representing the position of the telescope when directed to the first station, is now completed and the clamping screws 25, 30 and 39a remain clamped during the measurement of the angle.

The telescope is now directed to the target on the second, or right-hand station, clamps 8, 10 and 6b tightened and micro screw adjustments made as before to set the telescope exactly on the target. The left hand set of cooperating stop means A and C are now moved into engagement and clamped by tightening their respective clamping screws 25 and 39a. The plate screw 8 is then loosened to permit the telescope to be swung from side to side through the slight distance permitted by the play of pin 40 between surfaces 29 and 32a, and the stop disc 29c is adjusted so that the target is between the limits of this movement and is clamped in this adjusted position, all as previously described.

The observer is now ready to take repeated readings of the angle between the left and right hand stations quickly and with great ease, as will now be described.

There are various methods of multiplying observations in use, but for purposes of example, one well known procedure of repeating angles will be described consisting of four sets of ten repetitions each. Here it will be understood that by the method of repeating angles, the vernier is allowed to remain clamped at the previous reading each time that the angle is swung, instead of setting the vernier back to zero when making the back sight. In this way, a very reliable value for the angle will be obtained by dividing the total angle read on the vernier by the number of repetitions. Repeating this process with the telescope moved in a reverse direction further eliminates various errors due to adjustment of the instrument. This constitutes the first two sets of readings. The remaining two sets may consist in reading the explement of the angle in a similar manner.

For purposes of illustration, only the first set will be described in which the acute angle established by the left and right hand stops is read in a clockwise direction.

With the cooperating stops set as previously described at the left and right hand stations respectively, one of the verniers on the vernier plate is set opposite the zero of the plate circle, using the upper clamp and tangent screw 10 and 11 to clamp the vernier plate and bring the zeros into coincidence in a well known manner. With the plate clamp 8 and the telescope clamp 6b unclamped, the telescope is now swung to a position to pick up the first, or left hand station by lowering the pin 40 of stop arm D into engagement with the stop disc 29c of its cooperating stop means B representing the location of the first station, the conical face 29d serving as guiding means for directing the stop pin 40 into the groove. The telescope is now swung horizontally through the slight movement permitted by the side play of pin 40 in the groove, the target being sighted through the telescope. If the target is found to be approximately midway between the limits of movement, the lower plate clamp 8 is tightened and the telescope is adjusted by means of the tangent screw 9 to be exactly on the target. If, however, the target appears to be too far out of range, it is first adjusted to an approximate position before tightening the plate clamp 8. Loosening the upper clamp screw 10 to free the vernier, the telescope is next swung clockwise to the second station in which the pin 40 of stop arm C engages the groove in the cooperating disc 29c of stop means A. Sighting through the telescope, the target is picked up as before, the clamp screw 10 is tightened, and the telescope is adjusted to the target by means of the tangent screw 11 as previously explained. The vernier may be read at this point to obtain a check on the final result. Loosening the clamp 8, the telescope is now swung clockwise to the first station for a backsight using the cooperating stop means B and D to quickly locate the target as previously explained, the plate clamp 8 being tightened and the telescope again adjusted exactly to the target. Loosening the clamp 10, the telescope is now swung clockwise to the second station using the cooperating stop means A and C as before to quickly locate the target. By this procedure it will be noted that the angle obtained, if the vernier were read, would now represent twice the measure of the angle. This procedure is continued taking backsights with the plate clamp loose and foresights with the vernier clamp loose, until the desired number of observations have been taken, when the total angle through which the vernier has been moved relative to the plate is divided by the number of observations to obtain the true measure of the angle.

The structure of my invention is equally adapted for use in the method of repeating observations. In this method the stops are set as before, the only difference being in the use of the instrument. As the telescope is swung between the stations set up on the stops, the vernier is read at each station to obtain the measure of the angle between stations and the several sets of observations are taken at different positions on the plate circle.

As a result of my improvements it will be evident that an observer is enabled to measure horizontal angles with much less strain, due to the fact that he automatically picks up the target at each station each time that the cooperating stop means set up for that station are engaged. Further, the observer is enabled to read the angle by the method of repeating angles or by the method of repeating observations in very much less time than was previously required. It has been found that a trained observer using my invention can easily take four sets of observations, each including ten repetitions of the angle, in approximately two hours with no resulting fatigue, whereas prior methods, requiring the observer to locate the targets through the telescope, frequently required a whole day to measure a single angle and the observer was subject to a great deal of strain and fatigue.

The importance of this invention will be evident when it is considered that increasing the speed of the work greatly decreases the error in the result. This is well recognized and is due partly to the great strain placed on the observer in ordinary methods of sighting the targets and partly due to the fact that the longer the instrument is set up, the more chance that outside forces may influence the readings.

Figure 7:
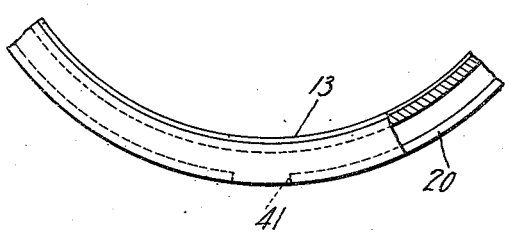
Figs. 7 and 8 are fragmentary views in plan and elevation respectively of a modified stop ring which may be used if a continuous ring is desired.
Figure 8:
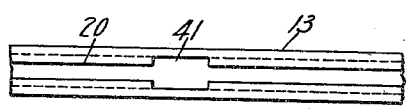

In Figs. 7 and 8, I have shown a modified form of stop ring which may be used if it is desired to have the ring continuous. Here it will be noted that the peripheral slot 20 in the outer face of the ring has a rectangular enlargement 41 at a suitable point on its periphery sufficiently large to permit the entrance of the sliding nut 18 into the rectangular passage in the ring. For ordinary purposes, however, the construction shown in Figure 1 is preferred since it permits ready access to the plate clamp screw 8 and tangent screw 9, the remainder of the stop ring being ample for all ordinary purposes.

Figure 9:
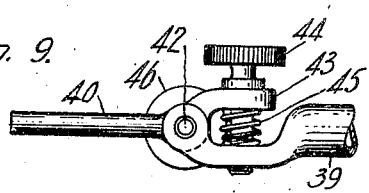
Fig. 9 is a detail showing a micro adjusting device for the vertically movable stop arms.

In Fig. 9, I have shown a micro-adjusting device for the vertically movable stop arms C and D which may be used, if desired. Here it will be noted that the stop pin 40 is pivotally mounted on a horizontal pivot screw 42 in the end of tubular arm 39 and has a flat extension 43 which overlies the arm. A shoulder screw 44 extends through the extension and is threaded into the arm, a spring 45 between the extension and arm serving to urge the extension 43 against the shoulder of the screw. The pivot screw 42 is provided with a knurled head 46 and serves to clamp the stop pin 40 rigidly to the arm.

While I have in this application specifically described one embodiment which my invention may assume in practice, it will be understood that the same is shown for purposes of illustration, and that the invention may be modified and embodied in various other forms and adapted to other types of instruments without departing from its spirit or the scope of the appended claims.

What I claim as new and desire to secure by Letters Patent is:—

1. The combination with a theodolite having a stationary portion constituting a fixed support and a movable portion rotatable about said support on a vertical axis, of cooperating stop means carried by said stationary and movable portions respectively, one of which has supporting means which is horizontally adjustable into a plurality of positions in which the stop means supported thereby is adapted to engage the other in different positions of angular adjustment of said movable portion.

2. The combination with a theodolite having a stationary portion constituting a fixed support and a movable portion rotatable about said support on a vertical axis, of a horizontally adjustable stop carried by said stationary portion, and a cooperating stop carried by said movable portion, said first mentioned stop having supporting means adjustable into a plurality of positions to enable said stop to cooperate with said cooperating stop in any position of angular adjustment of said movable portion.

3. The combination with a theodolite having a stationary portion constituting a fixed support and a movable portion rotatable about said support on a vertical axis, of a horizontally adjustable stop carried by said stationary portion, a cooperating vertically adjustable stop carried by said movable portion, and means for securing said cooperating stops in various positions of horizontal and vertical adjustment.

4. The combination with a theodolite having a fixed support and a telescope mounted thereon for movement about a vertical axis, of cooperating stop means, one of which has supporting means which is adjustably secured to said fixed support and the other of which is movable with said telescope, and means for securing said first mentioned supporting means and stop in various positions of adjustment on said fixed support corresponding to different angular positions of said telescope.

5. The combination with a theodolite having a fixed support and a telescope mounted thereon for movement about a vertical axis, of stop means movable with said telescope, and a pair of stop means cooperating with said movable stop means, each having supporting means which is horizontally adjustable on said fixed support, and means for securing said supporting means in various spaced relationships of said stop means on said fixed support to establish limits of angular movement of said telescope.

6. The combination with a theodolite having a fixed horizontal limb and a telescope mounted thereon for movement about a vertical axis, of stop means movable with said telescope, a pair of stop means cooperating with said movable stop means, each having supporting means which is horizontally adjustable on said horizontal limb, and means for securing said supporting means in various positions of adjustment relative to each other and relative to said horizontal limb to establish definite limits of angular movement of said telescope at different locations on said horizontal limb.

7. The combination with a theodolite having a fixed support and a telescope mounted on said support for movement about a vertical axis, of stop means carried by said support, and cooperating stop means movable with said telescope, one of said stop means being horizontally adjustable relative to said support, and the other being vertically adjustable relative thereto.

8. The combination with a theodolite having a fixed support and a telescope mounted thereon for movement about both a horizontal and a vertical axis, of cooperating stop means, one of which is carried by said support and is adjustable horizontally thereon about the vertical axis of said telescope, and the other of which is adjustable about the horizontal axis of said telescope toward and away from said support.

9. The combination with a theodolite having a fixed support and a telescope mounted thereon for movement about both a horizontal and a vertical axis, of cooperating stop means, one of which is carried by said support and is adjustable horizontally thereon into a plurality of radial positions, and the other of which is carried by the telescope and is adjustable toward and away from said support, said second stop means comprising an arm having a radially disposed stop member on the free end thereof.

10. The combination with a theodolite having a fixed support and a telescope mounted thereon for movement about both a horizontal and a vertical axis, of a track on said support, stop means horizontally adjustable on said track having abutment means thereon, a cooperating stop arm carried by said telescope and journaled at one end for adjustment about said horizontal axis and having abutment means at its free end adapted to cooperate with said first mentioned abutment means to locate said telescope in a predetermined position of horizontal and vertical adjustment corresponding to the adjustment of said cooperating stop means.

11. The combination with a theodolite having a fixed support and a telescope mounted thereon for movement about both a horizontal and a vertical axis, of an arcuate track on said support concentric with said vertical axis, stop means horizontally adjustable on said track, a cooperating stop arm carried by said telescope journaled at one end for movement about the horizontal axis of the latter and having radially directed abutment means at its free end, abutment means carried by said horizontally adjustable stop means adapted to be engaged by said radially directed abutment means and horizontally adjustable while the latter abutment means is in engagement therewith, and clamping means for fixing said stop arm and said horizontally adjustable abutment means in adjusted position.

12. The combination with a theodolite having a support and a telescope mounted thereon for movement about both a horizontal and a vertical axis, of an arcuate track on said support concentric with said vertical axis, stop means horizontally adjustable on said track having an upstanding stop supporting bracket, a cooperating stop arm carried by said telescope journaled at one end for movement about the horizontal axis of the latter and having a radially directed stop pin at its free end, abutment means carried by said stop supporting bracket having a member horizontally adjustable in said bracket and having a groove formed in said member adapted to receive said stop pin, clamping means for securing said stop arm in fixed angular relation to the horizontal axis of said telescope, and clamping means for securing said horizontally adjustable member in adjusted position on said bracket.

13. The combination with a theodolite having a fixed support and a telescope mounted thereon for movement about both a horizontal and a vertical axis, of an arcuate track on said support concentric with said vertical axis, stop means horizontally adjustable on said track including a radially disposed clamping bracket slidable on said track into a plurality of peripheral positions thereon, a stop supporting bracket carried by said clamping bracket, a stop member adjustable relative to said stop supporting bracket in a direction perpendicular to the radius of said clamping bracket and having a groove adjustable therewith into a plurality of radial planes, a stop arm journaled on said telescope for vertical movement having a radially directed stop pin adapted to be received in said groove and adjustable horizontally while therein by means of said adjustable stop member, clamping means for fixing said arm to said telescope in vertically adjusted position, and clamping means for securing said stop member in its horizontally adjusted position.

14. The combination with a theodolite having a portion constituting a fixed support and a relatively movable portion rotatable about said support on a vertical axis, of a stop support on said fixed support, a stop supporting bracket movable along said stop support, clamping means for securing said bracket in any desired horizontally adjusted position thereon, and a stop carried by said bracket having a horizontal micro-screw adjustment relative to said bracket.

15. The combination with a theodolite having a portion constituting a fixed support and a relatively movable portion rotatable about said support on a vertical axis, of a horizontal arcuate stop support on said fixed support, a radially disposed stop supporting bracket movable along said horizontal stop support, clamping means for securing said bracket in a plurality of radial positions on said stop support, a stop member having a threaded connection in said bracket permitting adjustment of the latter in a perpendicular direction relative to said bracket, and clamping means for clamping said stop member in adjusted position on said bracket.

16. The combination with a theodolite having a portion constituting a fixed support and a relatively movable portion rotatable about said support on a vertical axis, of a horizontal arcuate stop support on said fixed support, a radially disposed stop supporting bracket movable along said stop support, means for clamping said bracket in any horizontally adjusted position on said stop support, a stop member having a horizontal threaded connection in said bracket permitting adjustment of said stop in a direction perpendicular to said radial stop supporting bracket and having a radial groove therein, and cooperating radially directed stops means carried by said movable portion adapted to cooperate with said radial groove in various positions of horizontal adjustment of the latter.

17. The combination with a theodolite having a portion constituting a fixed support and a relatively movable portion rotatable on said support about a vertical axis, of a horizontal ring member carried by said support, a stop supporting bracket horizontally adjustable on said member, and clamping means for fixing said bracket in any selected radial position on said member.

18. The combination with a theodolite having a portion constituting a fixed support and a relatively movable portion rotatable on said support about a vertical axis, of a horizontal ring member carried by said support, a stop supporting bracket horizontally adjustable on said member, and clamping means for fixing said bracket in any selected radial position on said member, said ring member being continuous and surrounding said axis, and said bracket being adjustable into any desired radial position on said ring member relative to said axis.

19. The combination with a theodolite having a portion constituting a fixed support and a relatively movable portion rotatable about said support on a vertical axis, of a hollow horizontal ring carried by said support having an external track including a peripheral passage communicating with the interior of said ring, a stop supporting bracket having an external shoe horizontally adjustable on said track, a nut slidable within said ring, and clamping means extending through said peripheral passage cooperating with said nut to clamp said bracket in adjusted position on said track.

20. The combination with a theodolite having a portion constituting a fixed support and a relatively movable portion rotatable about said support on a vertical axis, of a hollow horizontal ring carried by said support having an external track including a peripheral passage communicating with the interior of said ring, a stop supporting bracket having an external shoe horizontally adjustable on said track, a nut slidable within said ring, and clamping means extending through said peripheral passage cooperating with said nut to clamp said bracket in adjusted position on said track, said passage having an enlarged portion at one point on its periphery through which said nut is adapted to be inserted into the interior of said ring.

21. The combination with a theodolite having a portion constituting a fixed support and a relatively movable portion rotatable about said support, of a stop arm having a radially directed stop pin carried by said movable portion, and a cooperating stop horizontally adjustable on said fixed support comprising a horizontally movable stud having means adapted to cooperate with said pin to direct it into a definite position.

22. The combination with a theodolite having a portion constituting a fixed support and a relatively movable portion rotatable about said support, of a stop arm having a radially directed stop pin carried by said movable portion, and a cooperating stop horizontally adjustable on said fixed support comprising a horizontally movable stud having a radially disposed groove adapted to receive said pin and having oppositely inclined guide faces leading into said groove.

23. The combination with a theodolite having a portion constituting a fixed support and a relatively movable portion rotatable about said support, of a stop arm having a radially directed stop pin carried by said movable portion, and a cooperating stop horizontally adjustable on said fixed support comprising a horizontally movable stud having a radially disposed groove adapted to receive said pin and having oppositely inclined guide faces leading into said groove, one of which constitutes a substantially conical disc by which said stud is adapted to be rotated to adjust said radial groove in a horizontal direction.

24. Stop means for a theodolite including a supporting member having mounting means adjustable relative to a support, a clamp for attaching said member in a plurality of adjusted positions relative to said support, and a stop member carried by said supporting member and adjustable relative to the latter.

25. Stop means for a theodolite including a supporting member, a clamp for attaching said member to a fixed support in a plurality of horizontally adjusted positions, a stop member carried by said supporting member having a horizontally adjustable support thereon, micro-adjusting means for adjusting said stop member horizontally on said supporting member, and means for clamping said stop member in adjusted position.

26. Stop means for a theodolite including a supporting member having a clamp at its one end adapted to be fixed in a plurality of horizontally adjusted positions on a fixed support, and a stop member carried at its opposite end having a horizontally disposed screw threaded connection with said supporting member, and clamping means for securing said stop member in a plurality of horizontally adjusted positions on said supporting member.

27. A horizontally adjustable stop member for a theodolite comprising a stud having an annular groove therein, and opposed annular guide faces inclined toward said groove.

28. A horizontally adjustable stop member for a theodolite comprising a screw threaded stud portion adapted to be horizontally threaded into a supporting bracket, and a head portion having an annular groove therein, said groove having oppositely diverging side walls, one of which terminates in a grasping rim for rotating said screw-threaded stud to adjust the latter horizontally relative to its support.

29. A horizontally adjustable stop member for a theodolite comprising an axial stud member adapted to be adjustably threaded at one end into a supporting bracket and having adjacent its other end an enlarged frustro-conical head portion having its inclined face leading to said axial stud, and a cooperating member adjustable axially of said stud toward and away from said inclined face.

30. The combination with a theodolite having a fixed support and a telescope mounted thereon for movement about both a horizontal and a vertical axis, of two sets of cooperating horizontally and vertically adjustable stop means carried by said support and telescope respectively, and means for clamping said stop means in different positions of horizontal and vertical adjustment representing different horizontal and vertical pointings of said telescope.

31. The combination with a theodolite having a fixed support and a telescope mounted thereon for movement about both a horizontal and a vertical axis, of a horizontally movable bracket carried by said support, a vertically movable arm supported on said telescope, an adjustable stop member carried by said bracket, and a cooperating adjustable stop member supported on said arm, one of said stop members being vertically adjustable relative to its support and the other being horizontally adjustable.

CURTIS H. VEEDER.